(12) United States Patent
Bajko et al.

(10) Patent No.: US 7,835,528 B2
(45) Date of Patent: Nov. 16, 2010

(54) METHOD AND APPARATUS FOR REFRESHING KEYS WITHIN A BOOTSTRAPPING ARCHITECTURE

(75) Inventors: Gabor Bajko, San Diego, CA (US); Tat Keung Chan, San Diego, CA (US)

(73) Assignee: Nokia Corporation, Espoo (FI)

( * ) Notice: Subject to any disclaimer, the term of this patent is extended or adjusted under 35 U.S.C. 154(b) by 1243 days.

(21) Appl. No.: 11/397,837

(22) Filed: Apr. 4, 2006

(65) Prior Publication Data

US 2007/0074275 A1 Mar. 29, 2007

Related U.S. Application Data

(60) Provisional application No. 60/720,445, filed on Sep. 26, 2005.

(51) Int. Cl.
*H04L 9/00* (2006.01)
*H04L 9/08* (2006.01)
(52) U.S. Cl. .................. 380/283; 380/278; 380/277
(58) Field of Classification Search .......... 380/283, 380/278, 277
See application file for complete search history.

(56) References Cited

U.S. PATENT DOCUMENTS

2006/0174117 A1 8/2006 Laitinen

FOREIGN PATENT DOCUMENTS

| WO | WO 93/10509 | 5/1993 |
|---|---|---|
| WO | WO 2006/085207 | 8/2006 |
| WO | PCT/IB2006/002668 | 9/2006 |

OTHER PUBLICATIONS

Jack L. Burbank and William T. Kasch; IEEE 802.16 Broadband Wireless Technology and Its Application to the Military Problem Space; Jack L. Burbank and William T. Kasch; MILCOM 2005.*
Yanbin Qian; Xingyuan Chen; Xuehui Du; , "A Security Context Transfer Method for Integrated Space Network," Information Science and Engieering, 2008. ISISE '08. International Symposium on, vol. 1, no., pp. 276-280, Dec. 20-22, 2008.*
"Universal Mobile Telecommunications System (UMTS); Generic Authentication Architecture (GAA); Generic bootstrapping architecture (3GPP TS 33.220 version 6.3.0 Release 6)," ETSI TS 133 220; ETSI Standards, v6.3.0, Dec. 2004, pp. 22-27.
"Generic Bootstrapping Architecture (GBA) Framework," 3$^{rd}$ Generation Partnership Project 2 (3GPP2), Mar. 30, 2006, Version 1.0, 3GPP2 S.S0109-0.
Office Action of Corresponding Korean Application No. 10-2008-7007240 dated Feb. 25, 2010. pp. 1-8.
3GPP TS 33.220 v6.3.0 (Dec. 2004), Generic Authentication Architecture (GAA), Generic bootstrapping architecture (Release 6), pp. 1-38.
Office Action of Corresponding Korean Application No. 10-2008-7007240 dated Aug. 30, 2010, pp. 1-6.

* cited by examiner

*Primary Examiner*—David Y Jung
(74) *Attorney, Agent, or Firm*—Ditthavong Mori & Steiner, P.C.

(57) ABSTRACT

An approach is provided for refreshing keys in a communication system. An application request is transmitted to a network element configured to provide secure services. A message is received, in response to the application request, indicating refreshment of a key that is used to provide secure communications with the network element. A refreshed key is derived based on the received message.

32 Claims, 12 Drawing Sheets

METHOD AND APPARATUS FOR REFRESHING KEYS WITHIN A BOOTSTRAPPING ARCHITECTURE

RELATED APPLICATIONS

This application claims the benefit of the earlier filing date under 35 U.S.C. §119(e) of U.S. Provisional Application Ser. No. 60/720,445 filed Sep. 26, 2005, entitled "Method and Apparatus For Refreshing Keys within a Bootstrapping Architecture"; the entirety of which is incorporated by reference.

FIELD OF THE INVENTION

The invention relates to communications, and more particularly, to providing authentication services in a communication system.

BACKGROUND OF THE INVENTION

Radio communication systems, such as cellular systems (e.g., spread spectrum systems (such as Code Division Multiple Access (CDMA) networks), or Time Division Multiple Access (TDMA) networks), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One key area of effort involves key provisioning for authentication and establishing secure communications. Unfortunately, this function is not effectively supported by current protocols.

Therefore, there is a need for an approach to provide key provisioning to facilitate bootstrapping between network elements (or devices) without requiring the network elements to utilize a common protocol, thereby avoiding hardware upgrades/modifications.

These and other needs are addressed by the invention, in which an approach is presented for more effectively supporting key provisioning in a bootstrapping architecture.

SUMMARY OF THE INVENTION

These and other needs are addressed by the invention, in which an approach is presented for refreshing session keys in a communication network for providing secure communications.

According to one aspect of an embodiment of the invention, a method comprises transmitting an application request to a network element configured to provide authentication and secure services. The method also comprises receiving a message, in response to the application request, indicating refreshment of a key that is used to provide secure communications with the network element. The method further comprises deriving a refreshed key based on the received message.

According to another aspect of an embodiment of the invention, a method comprises generating a random number corresponding to a refreshed key. The method also comprises transmitting an application request to a network element configured to provide authentication and secure services, wherein the application request specifies a transaction identifier, the random number, and an application protocol message. The network element is further configured to forward an authentication request to a bootstrapping network element configured to provide bootstrapping functions. The authentication request specifies the transaction identifier, the random number and a domain name associated with the network element. The bootstrapping network element is further configured to retrieve the bootstrapping key based on the transaction identifier, to generate a fresh session key based on the bootstrapping key and the random number, and to generate an authentication answer that includes the retrieved refreshed key, a lifetime parameter associated with the generated fresh session key, and a user profile. Further, the method comprises receiving an application answer from the network element indicating successful authentication.

According to another aspect of an embodiment of the invention, a method comprises generating a first random number, and transmitting an application request to a network element configured to provide secure services. The application request specifies a transaction identifier, the random number, and an application protocol message. The network element is further configured to select a second random number. The method also comprises receiving an application answer specifying the second random number from the network element. Further, the method comprises deriving a fresh session key based on a bootstrapping key, the first random number, and a second random number, wherein the fresh session key is used to provide secure communication with the network element.

According to another aspect of an embodiment of the invention, an apparatus comprises a processor configured to generate an application request for transmission to a network element configured to provide secure services. The processor is further configured to receive a message, in response to the application request, indicating refreshment of a key that is used to provide secure communications with the network element. The processor is further configured to derive a refreshed key based on the received message.

According to another aspect of an embodiment of the invention, an apparatus comprises a processor configured to generate a random number. The apparatus also comprises a transceiver configured to transmit an application request to a network element configured to provide secure services. The application request specifies a transaction identifier, the random number, and an application protocol message. The network element is further configured to forward an authentication request to a bootstrapping network element configured to provide bootstrapping functions. The authentication request specifies the transaction identifier, the random number and a domain name associated with the network element. The bootstrapping network element is further configured to retrieve a bootstrapping key based on the transaction identifier, to generate a fresh session key based on the bootstrapping key and the random number, and to generate an authentication answer that includes the generated fresh session key, a lifetime parameter associated with the fresh session key, and a user profile. The transceiver is further configured to receive an application answer from the network element indicating successful authentication.

According to another aspect of an embodiment of the invention, an apparatus comprises a processor configured to generate a first random number. The apparatus also comprises a transceiver coupled to the processor and configured to transmit an application request to the network element, wherein the application request specifies a transaction identifier, the random number, and an application protocol message. The network element is further configured to select a second random number. The transceiver is further configured to receive an application answer specifying the second random number from the network element. The processor is further configured to derive a fresh session key based on a bootstrapping key, the first random number, and a second random number, wherein the fresh session key is used to provide secure communication with the network element.

According to another aspect of an embodiment of the invention, a method comprises receiving an application request from a user equipment. The request specifies a transaction identifier. The method also comprises determining whether the user equipment is indicating that a new bootstrapping has been performed or is seeking to refresh a session key based on the received transaction identifier. The method further comprises refreshing the session key or using a new bootstrapping key material associated with the new bootstrapping based on the determination.

According to yet another aspect of an embodiment of the invention, a system comprises means for receiving an application request from a user equipment. The request specifies a transaction identifier. The system also comprises means for determining whether the user equipment is indicating that a new bootstrapping has been performed or is seeking to refresh a session key based on the received transaction identifier. Further, the system comprises means for refreshing the session key or using a new bootstrapping key material associated with the new bootstrapping based on the determination.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF THE PREFERRED EMBODIMENT

An apparatus, method, and software for refreshing keys utilizing a generic bootstrapping architecture are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Further, although the embodiments of the invention are discussed with respect to a spread spectrum system, it is recognized by one of ordinary skill in the art that the embodiments of the inventions have applicability to any type of radio communication system as well as wired networks. Additionally, it is contemplated that the protocols and processes described herein can be performed not only by mobile and/or wireless devices, but by any fixed (or non-mobile) communication device (e.g., desktop computer, network appliance, etc.) or network element or node.

Various embodiments of the invention relate to key refreshing mechanisms in spread spectrum networks, such as 3GPP (Universal Mobile Telecommunications System (UMTS)) and 3GPP2 (cdma2000). The invention, according to one embodiment, provides procedures for the support for cdma2000 IP data connectivity and mobility in wireless networks utilizing $3^{rd}$ Generation Partnership Project (3GPP2) Generic Bootstrapping Architecture (GBA) functionality in Code Division Multiple Access (CDMA) EV-DO (Evolution Data-Only) networks. By way of example, exemplary bootstrapping procedures are defined in 3GPP TS 33.220, 3GPP TS 24.109 and 3GPP2 S.P0109, which are incorporated herein by reference in their entireties.

Although the key provisioning approach, according to various exemplary embodiments, are discussed in the context of a wireless network environment, the approach can be applied to other environments, such as interworking between CDMA2000 and WiMax (Worldwide Interoperability for Microwave Access) access, or interaction between 3GPP networks and WLAN IW or WiMax accesses.

Figure 1:
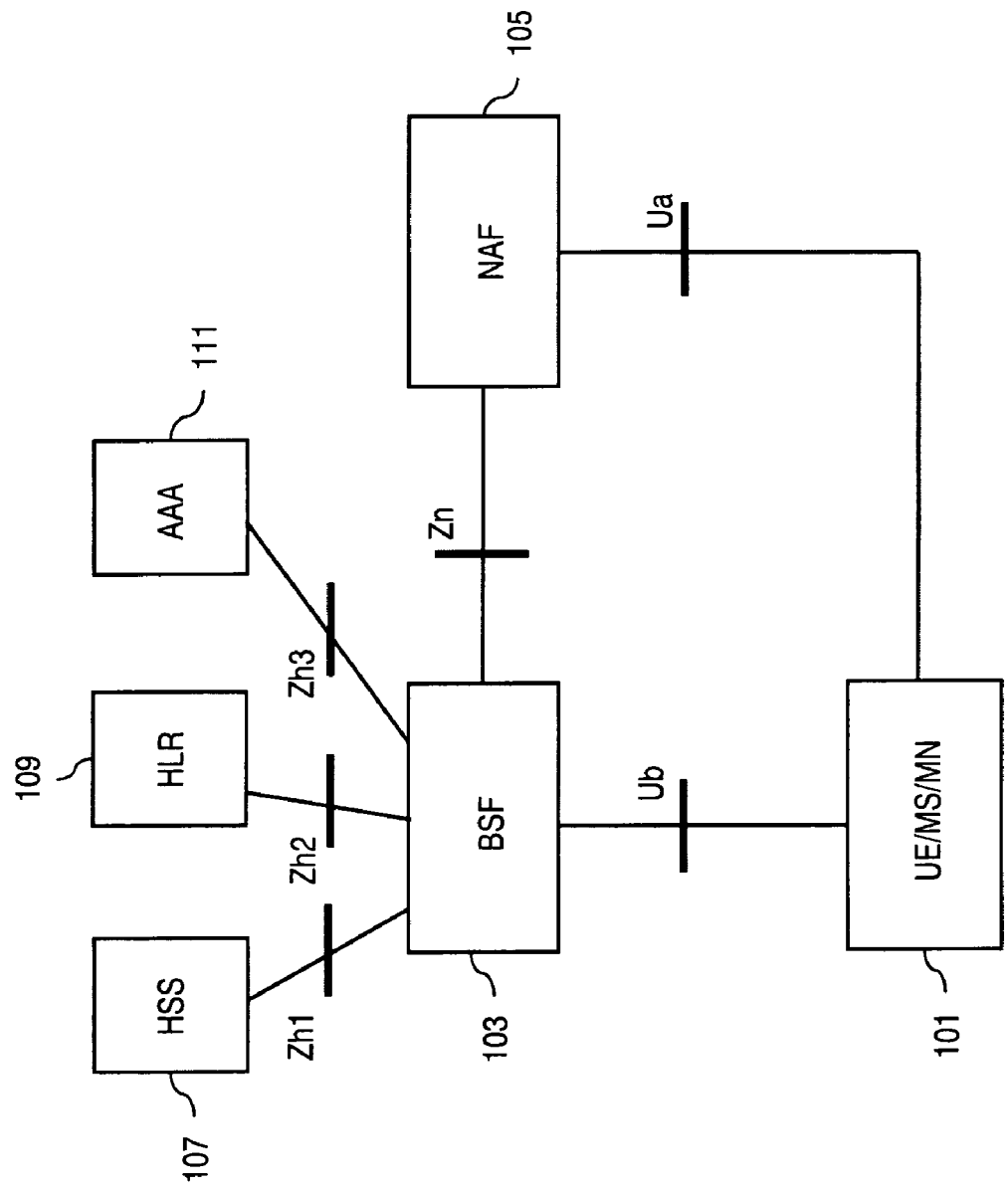
FIG. 1 is a diagram of an exemplary bootstrapping architecture capable of providing key refreshment, in accordance with various embodiments of the invention.

FIG. 1 is a diagram of an exemplary bootstrapping architecture capable of providing key refreshment, in accordance with various embodiments of the invention. By way of illustration, the bootstrapping architecture 100 is explained in the context of the Generic Bootstrapping Architecture (GBA) in 3GPP2 (Third Generation Partnership Project 2). GBA is one component of the Generic Authentication Architecture (GAA) defined in 3GPP/3GPP2 (Third Generation Partnership Project/Third Generation Partnership Project 2). The basic elements include an UE (User Equipment) 101, a Bootstrapping Server Function (BSF) 103, which is responsible for the bootstrapping, and a Network Application Function (NAF) 105. The NAF 105, in an exemplary embodiment, can be hosted in any type of network element, such as a server; the NAF 105 accordingly can serve as an application server that the UE 101 communicates with in using the derived security keys. As used herein, the term "application" (according to various embodiments) refers to a communication service, and is not limited to an actual instance of an application within the application server.

The BSF 103 handles subscriber's bootstrapping information after the bootstrapping procedure in the system 100. The bootstrapping procedure creates security association between the UE 101 and the BSF 103. Using the stored user's bootstrapping information and the security association, the BSF 103 can provide secure services to network application functions (such as NAF 105) contacted by the UE 101. As used herein, "secure services" involves providing services in a secure manner. Bootstrapping can be performed between the UE 101 and the BSF 103 based on, for instance, a long term shared secret maintained between the UE 101 and the network. After the bootstrapping has been completed, the UE 101 and the NAF 105 can run some application specific protocol where the authentication, or in general, security, of messages will be based on session keys derived from the key agreed on during bootstrapping. Security of messages includes but is not limited to authentication, authorization, confidentiality, and integrity protection.

The BSF 103 and the UE 101 mutually authenticate and agree on a key that are afterwards used to derive session keys for use between the UE 101 and the NAF 105. The BSF 103 can restrict the applicability of the key material to a specific NAF (e.g., NAF 105) by using a key derivation procedure. In an exemplary embodiment, after the bootstrapping procedure, both the UE 101 and the BSF 103 have agreed on the key material (Ks), a bootstrapping transaction identifier (B-TID), a key material lifetime, and other parameters, the key material corresponding to the NAF 105 (denoted "Ks_NAF") and B-TID may be used in the Ua interface to mutually authenticate and optionally secure traffic between the UE 101 and the NAF 105. The terms "mobile station (MS)," "user equipment (UE)," "user terminal," and "mobile node (MN)," are used interchangeably depending on the context to denote any type of client device or terminal. For example, the 3GPP standard employs the term UE, and the 3GPP2 standard adopts MS; while MN is used in a mobile Internet Protocol (IP)-related context. The UE 101, for example, can be a mobile communications device or mobile telephone, or other wireless devices. The UE 101 can also be such devices as personal digital assistants (PDA) with transceiver capability or personal computers with transceiver capability. The UE 101 transmits and receives using wireless communications transceivers to communicate with the BSF 103. The BSF 103 transmits to and receives data from home location register 109.

As shown, a number of reference points, Ub, Ua, Zh1, Zh2, Zh3 and Zn, are defined to support the bootstrapping system 100. The reference point Ub provides mutual authentication between the UE 101 and the BSF 103, permitting the UE 101 to bootstrap the key material Ks. The Ua interface carries the application protocol, which is secured by the key materials derived from the agreed key materials, Ks, between the UE 101 and the BSF 103. The Zh1, Zh2, and Zh3 reference points are utilized to exchange the required authentication information and user security settings between the BSF 103 and the Home Subscriber System (HSS) 107 (in which Authentication and Key Agreement (AKA) is used in bootstrapping), a Home Location Register (HLR) 109 (in which CAVE (Cellular Authentication and Voice Encryption) algorithm can be used to bootstrap), and an Authentication, Authorization and Accounting (AAA) server 111 (in which MN-AAA key is used in bootstrapping). The Zn interface allows the NAF 105 to fetch the derived key material and application-specific user security settings from the BSF 103.

The GBA operations, according to an exemplary embodiment, are as follows. A bootstrapping procedure is performed between the UE 101 and the BSF 103 (which is located in the home network). During bootstrapping, mutual authentication is performed between the MS 101 and the network based on a long term shared secret between the MS 101 and the home network. For example, in 3GPP2, this long term shared secret may be stored in the HSS 107, the BLR 109, and the AAA server 111. In 3GPP, bootstrapping is based either on AKA or Subscriber Identity Module (SIM) authentication. As a result of the bootstrapping procedure, a bootstrapping key, Ks, is generated by both the MS 101 and the BSF 103. The Ks is also associated with a Bootstrapping Transaction Identifier (B-TID) and a lifetime, which provides a value relating to expiration or duration of the key, Ks.

As a next step, the MS 101 indicates to an application function in the network, referred to as the NAF 105, that GBA can be used for providing a shared secret for the application. Alternatively, the NAF 105 can indicate to the MS 101 that GBA is to be used. Thereafter, the NAF 105 retrieves the Ks_NAF from the BSF 103; concurrently, the MS 101 derives the same Ks_NAF. The Ks_NAF is then used as the shared secret between the MS 101 and the NAF 105 for any further security operations. For added security, keys are refreshed, either periodically or on demand.

The processes of refreshing the keys in the system 100 are now described.

Figure 2:
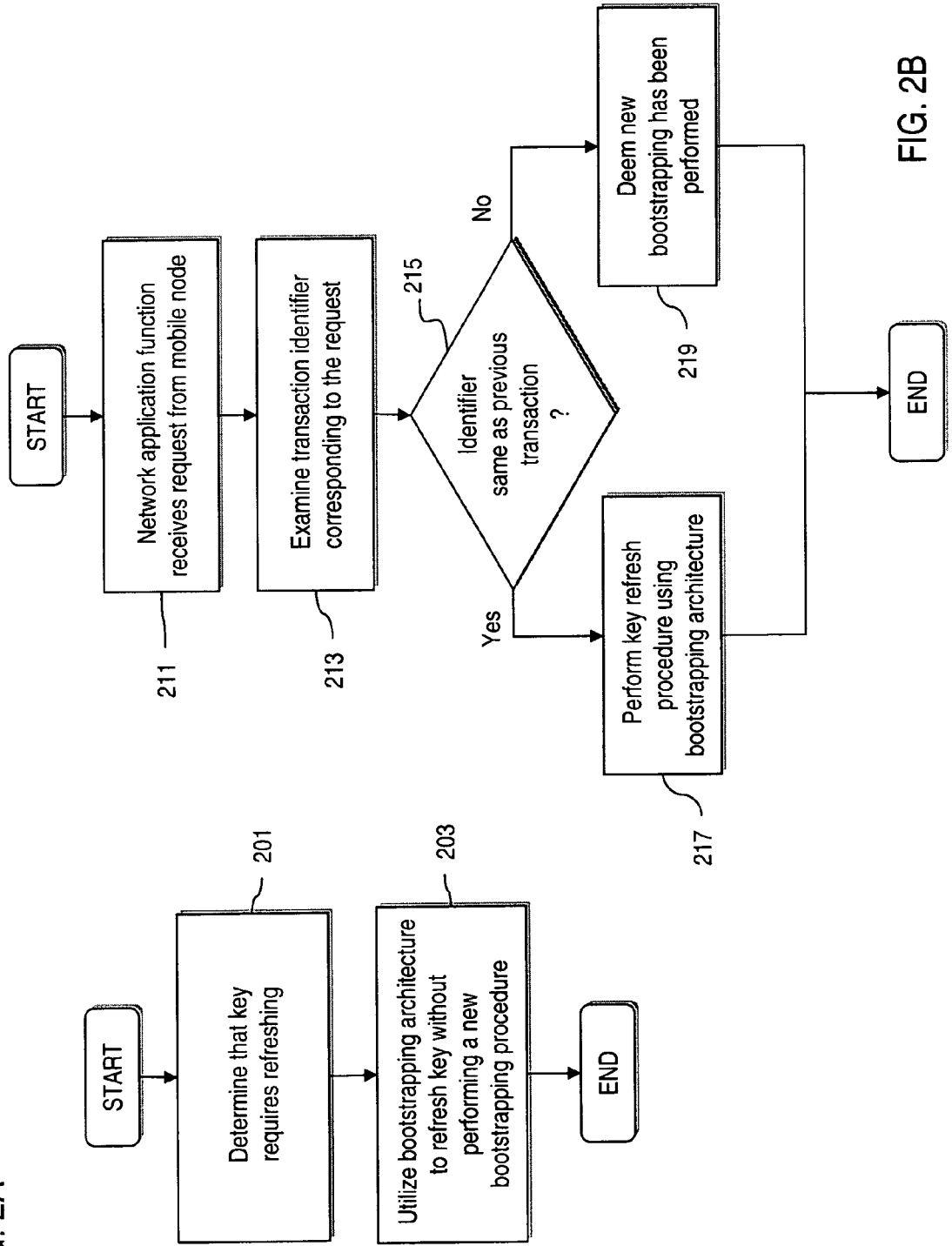
FIGS. 2A and 2B are flowcharts of key refreshing processes, according to various embodiments of the invention.

FIGS. 2A and 2B are flowcharts of key refreshing processes, according to various embodiments of the invention. As shown in FIG. 2A, the general process of refreshing keys involves determining whether the key requires refreshing, as in step 201. Next, the bootstrapping architecture of the system 100 is utilized to refresh the key without performing a new bootstrapping procedure, per step 203. For example, in 3GPP2 GBA, this NAF key refreshing mechanism would allow a NAF key to be refreshed without having to perform a new bootstrapping. Initiating a new bootstrapping procedure is costly in terms of computations, air interface, and other resources in both the UE 101 and the network. Therefore, it is important that the process determines when to bootstrap and when to refresh (this is explained with respect to FIG. 2B).

It is recognized that the Ua protocols can be modified to provide an indication or identifier that instructs the MN 101 on the processes to perform—i.e., execute key refreshing mechanism or perform a new bootstrap. However, under certain circumstances, the Ua protocol might not support such indication; additionally, it may not be desirable to modify the protocol.

The following procedure advantageously avoids modifying the protocol, but addresses the ambiguity within the traditional approach (e.g., current GBA specification). The MN 101 requires a valid Ks before contacting an NAF (e.g., NAF 105). If no valid Ks exists, the MN 101 performs a new bootstrapping procedure before contacting the NAF 105. In this example, it is assumed that the NAF 105 supports a key refreshing mechanism, while such mechanism is made option to the MN 101.

In step 211, the NAF 105 receives an application request from the MN 101. If the NAF 105 rejects a request from the MN 101 (which contains the credentials), then the MN 101 refreshes its keys, assuming the refresh mechanism is supported in the MN 101. Otherwise, the MN 101 performs bootstrapping. The NAF 105 can determine, in an exemplary embodiment, whether the MN 101 is indicating that a new bootstrapping has been performed or is seeking to refresh its keys based on a transaction identifier, such as the B-TID (step 213). If the B-TID is the same (i.e., matches) as the one used in the previous transaction, as determined in step 215, then the MN 101 performs a refresh (step 217); otherwise, a new bootstrapping procedure has been performed (step 219).

Figure 3:
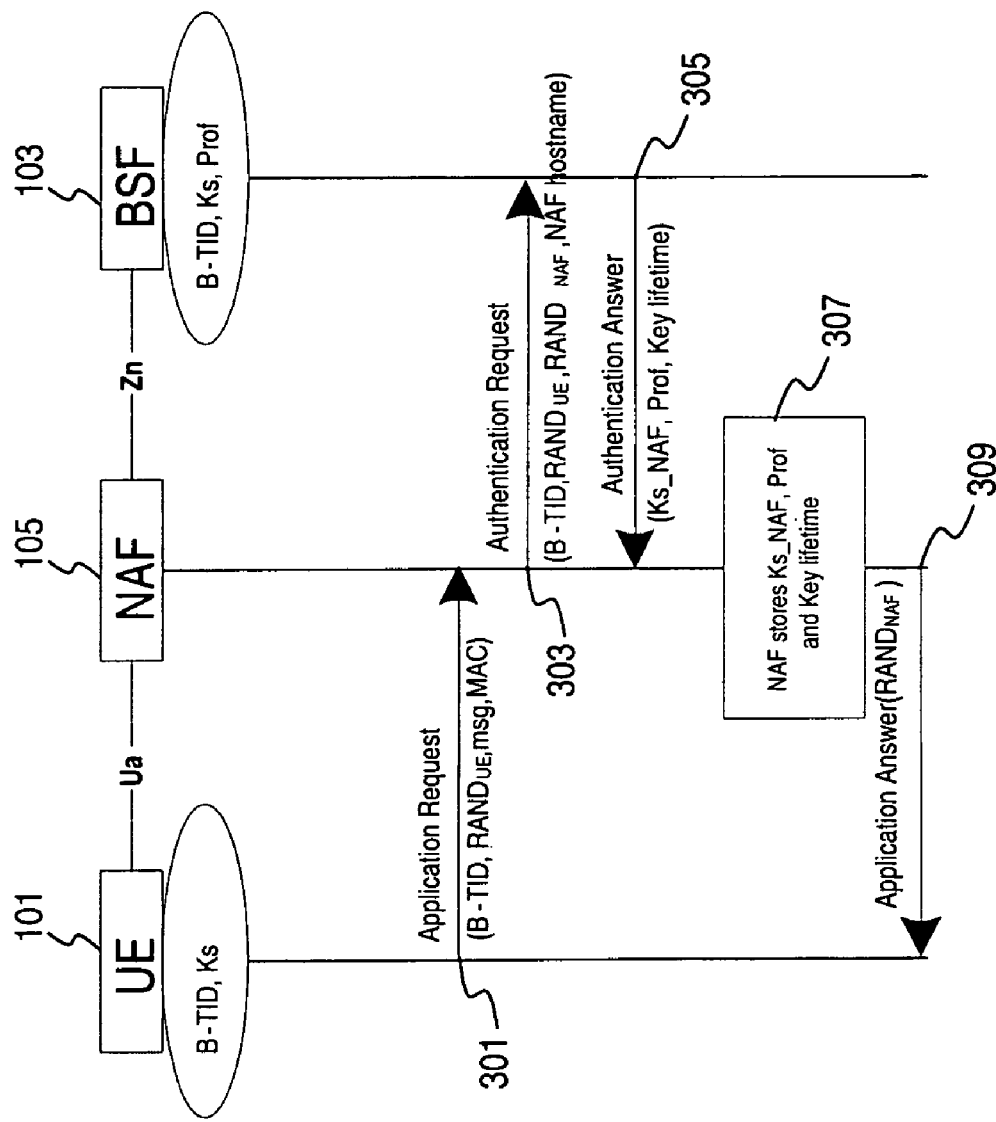
FIG. 3 is a diagram of a conventional bootstrapping procedure for refreshing session keys.

FIG. 3 is a diagram of a conventional bootstrapping procedure for refreshing session keys. This approach follows the NAF key refreshing mechanism described in 3GPP2 specification S.P0109, and is explained to contrast the refresh mechanisms detailed in FIGS. 4-7. In the scenario of FIG. 3, it is assumed that the UE 101 is aware, from the start, that security materials derived by GBA will be used for securing the Ua interface, and that the NAF key (Ks_NAF) needs to be refreshed. In step 301, the UE 101 sends an application request to the NAF 105. The request comprises a transaction identifier (e.g., Bootstrapping Transaction Identifier, B-TID), which need not necessarily be explicitly provided; the application protocol message (denoted "msg"); a Message Authentication Code (MAC); and the UE nonce ($RAND_{UE}$)—which is a random number provided by the UE 101. The "msg" represents the application specific dataset. The MAC is a predetermined value used to authenticate the particular message.

Next, the NAF 105 selects a random number, referred to as the $RAND_{NAF}$. The NAF 105 then sends an authentication request, as in step 303, to the BSF 103. The request comprises the B-TID, $RAND_{UE}$, $RAND_{NAF}$, and NAF_Id, which is the fully qualified domain name (FQDN) of the NAF 105. The BSF 103 retrieves the Ks based on the received B-TID. The BSF 103 then derives a new Ks_NAF from Ks, $RAND_{UE}$, $RAND_{NAF}$, NAF_Id, and possibly other information. The BSF 103 returns the Ks_NAF, together with its lifetime, and possibly the user profile, back to the NAF 105 in the authentication answer message, per step 305. "Prof" denotes the application specific part (or portion) of the user profile. The NAF 105 stores, as in step 307, the Ks_NAF, its associated lifetime, and user profile, and sends the $RAND_{NAF}$ back to the UE 101 in the application answer message (step 309). It is noted that only at this point when the UE 101 finally receives the $RAND_{NAF}$ can the UE 101 compute the refreshed Ks_NAF.

The above conventional NAF key refreshing mechanism, unfortunately, involves both a nonce from the UE 101 and a nonce from the NAF 105, and that the UE 101 has to send the nonce first. Due to this inflexibility, the UE 101 and the NAF 105 may have to exchange a multiple messages before a NAF key can be refreshed, which not only wastes precious over-the-air resource, but introduces greater delay. Additionally, the nonces have to be sent within an existing Ua protocol; however, not all Ua protocols support carrying nonces in both directions.

It is noted that the current GBA standard is ambiguous with respect to detecting a refresh or re-initiation of the bootstrapping process. In particular, the NAF 105 is capable of requesting the UE 101 to perform a new bootstrapping. For Ua protocols that do not support explicit indication, the UE 101 will not know when to refresh or when to bootstrap again. The approach, according to an embodiment of the invention, eliminates this ambiguity.

The various embodiments of the invention provide several simplified NAF key refreshing mechanisms vis-à-vis the conventional mechanism of FIG. 3. Further, the approach advantageously provides a mechanism to refresh the keys with minimum modifications to the existing protocols on the Ua interface.

FIGS. 4-7 illustrate various embodiments to implement the NAF key refreshing mechanism.

Figure 4:
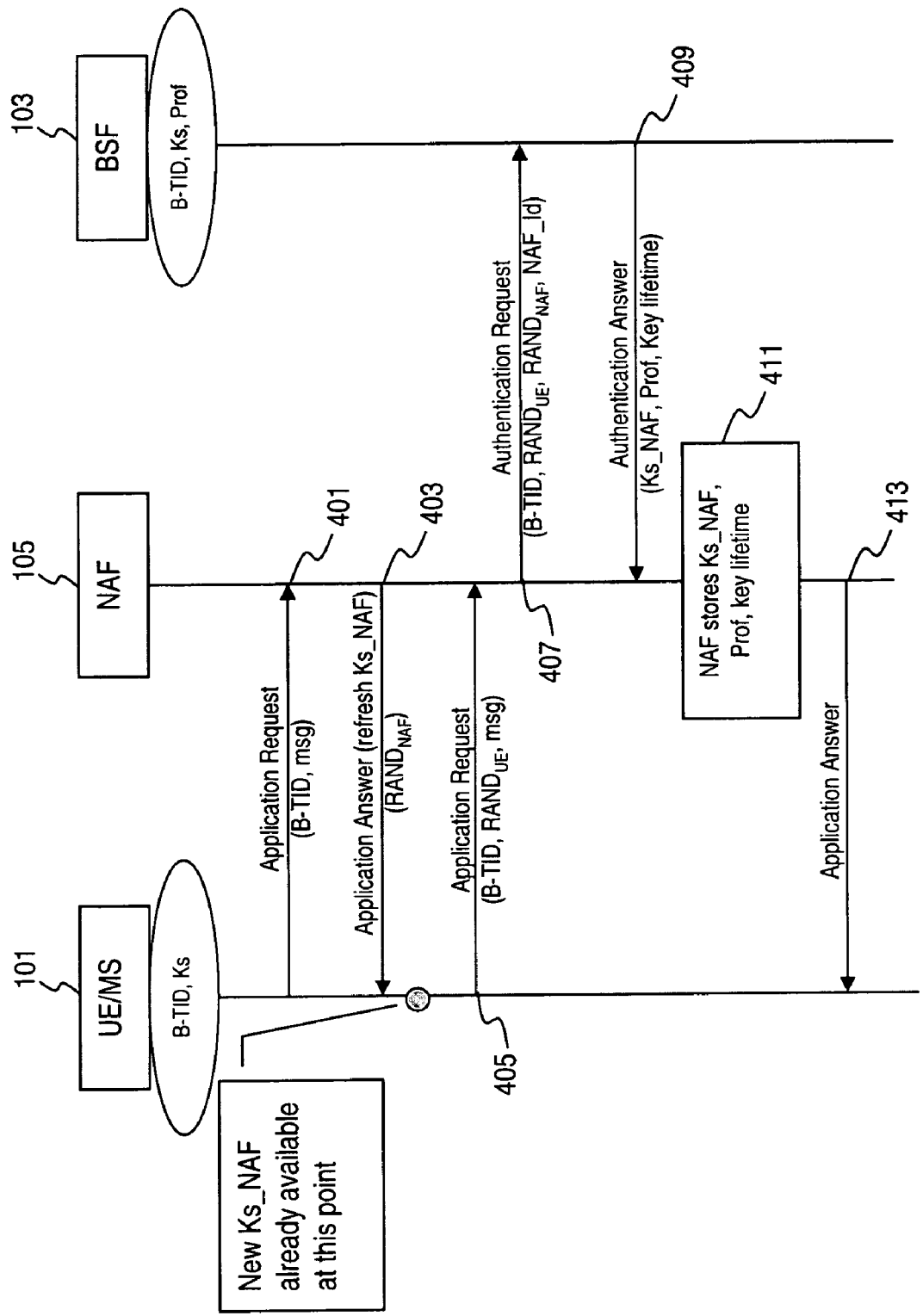
FIG. 4 is a diagram of a procedure for refreshing a session key by utilizing two nonces, according to an embodiment of the invention.

FIG. 4 is a diagram of a procedure for refreshing a session key by utilizing two nonces, according to an embodiment of the invention. In this embodiment, two nonces are utilized, in which the NAF 105 can send a nonce first. That is, both $RAND_{UE}$ and $RAND_{NAF}$ are used; however, the NAF 105 is permitted to send its nonce first, such that the UE 101 can derive the refreshed Ks_NAF 105 earlier. The operation is explained as follows.

In step 401, the UE 101 sends an application request with B-TID, and the application protocol message (denoted "msg" in the figure). The NAF 105 sends, per step 403, an application answer, with an indication (which may be implicit) that Ks_NAF should be refreshed. The NAF 105 also "proactively" includes its own nonce, $RAND_{NAF}$. The NAF 105 may also include an authentication challenge.

Next, the UE 101 selects its own random number, $RAND_{UE}$. At this point, the UE 101 is able to derive the refreshed Ks_NAF 105. The UE 101 sends an application request (step 405), possibly with a credential based on the refreshed Ks_NAF 105. The request also comprises the B-TID, the application protocol message, and $RAND_{UE}$. In step 407, the NAF 105 then sends an authentication request to the BSF 103. The request comprises the B-TID, $RAND_{UE}$, $RAND_{NAF}$, and NAF_Id; the NAF_Id is a fully qualified domain name of the NAF 105.

Thereafter, the BSF 103 retrieves the Ks based on the B-TID received. The BSF 103 then derives a new Ks_NAF from Ks, $RAND_{UE}$, $RAND_{NAF}$, NAF_Id, and possibly other information. The BSF 103 forwards the Ks_NAF, together with its lifetime, and optionally the user profile to the NAF 105 in the authentication answer message, per step 409. As previously indicated, "Prof" denotes the application specific part or portion of the user profile.

In step 411, the NAF 105 stores the Ks_NAF, its associated lifetime and user profile. At this point, the NAF 105 can verify the credential sent by the UE 101 (in step 405) using the Ks_NAF. If successful, the UE 101 is authenticated and an application answer is sent back to the UE 101. By allowing the NAF 105 to send its $RAND_{NAF}$ first, the Ks_NAF is made available at the UE 101 earlier than the conventional approach.

The above approach of FIG. 4 employs two nonces to efficiently provide key refreshment. Alternatively, only a single nonce (either $RAND_{UE}$ or $RAND_{NAF}$, but not both) can be used to refresh the session keys. Accordingly, two cases exist: (1) $RAND_{UE}$ (shown in FIG. 5), and (2) $RAND_{NAF}$ (shown in FIG. 6).

Figure 5:
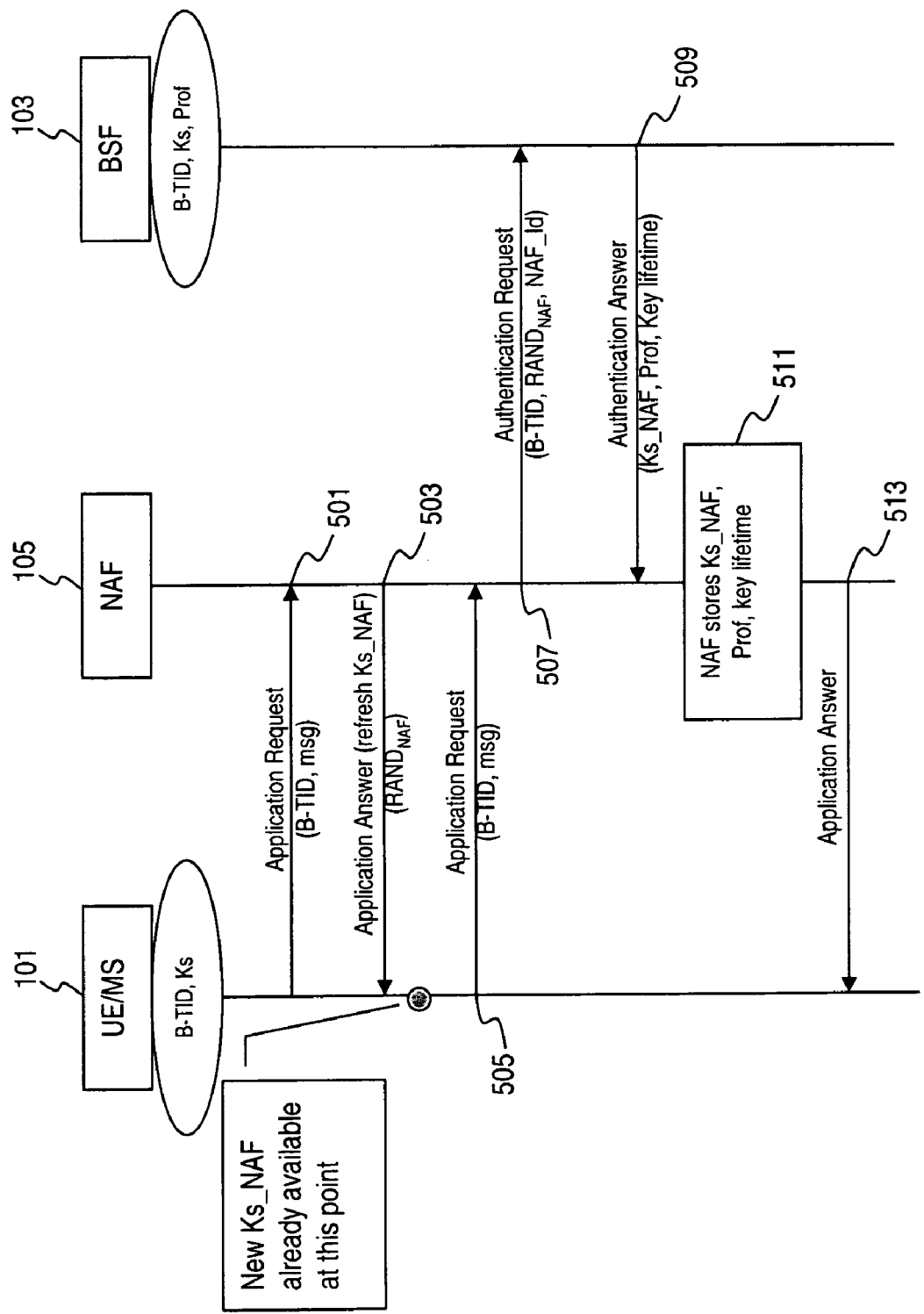
FIG. 5 is a diagram of a procedure for refreshing a session key by utilizing a random number of a network application, according to an embodiment of the invention.

FIG. 5 is a diagram of a procedure for refreshing a session key by utilizing a random number of a network application, according to an embodiment of the invention. This case may apply when the UE 101 does not know before contacting the NAF 105 that Ks_NAF needs to be refreshed. As shown, the UE 101 sends an application request with B-TID, and the application protocol message (denoted "msg"), as in step 501. In step 503, the NAF 105 sends an application answer, with an indication (which may be implicit) that Ks_NAF should be refreshed. The NAF 105 also "proactively" includes its own nonce, $RAND_{NAF}$. The NAF 105 may also include an authentication challenge (not shown).

At this point, the UE 101 is able to derive the refreshed Ks_NAF 105 from Ks, $RAND_{NAF}$, NAF_Id, and possibly other information, but not $RAND_{UE}$. The UE 101 therefore can include a credential that is based on the newly refreshed Ks_NAF (not shown). The UE 101 sends a new application request, per step 505. The request also comprises the B-TID, and the application protocol message.

In step 507, the NAF 105 sends an authentication request to the BSF 103. By way of example, the request comprises the B-TID, $RAND_{NAF}$, and NAF_Id (fully qualified domain name of the NAF 105). The BSF 103 retrieves the Ks based on the received B-TID. The BSF 103 then derives a new Ks_NAF from Ks, $RAND_{NAF}$, and NAF_Id; in addition to these parameters, the derivation can also be based on other information. The BSF 103 specifies the Ks_NAF, the associated lifetime, and the user profile (optional) in the authentication answer message (step 509) for transmission to the NAF 105.

The NAF 105 stores, as in step 511, the Ks_NAF, its associated lifetime and user profile. At this point, the NAF 105 can verify the credential sent by the UE 101 in step 505 using the Ks_NAF. If successful, the UE 101 is authenticated, and an application answer is issued to the UE 101.

Figure 6:
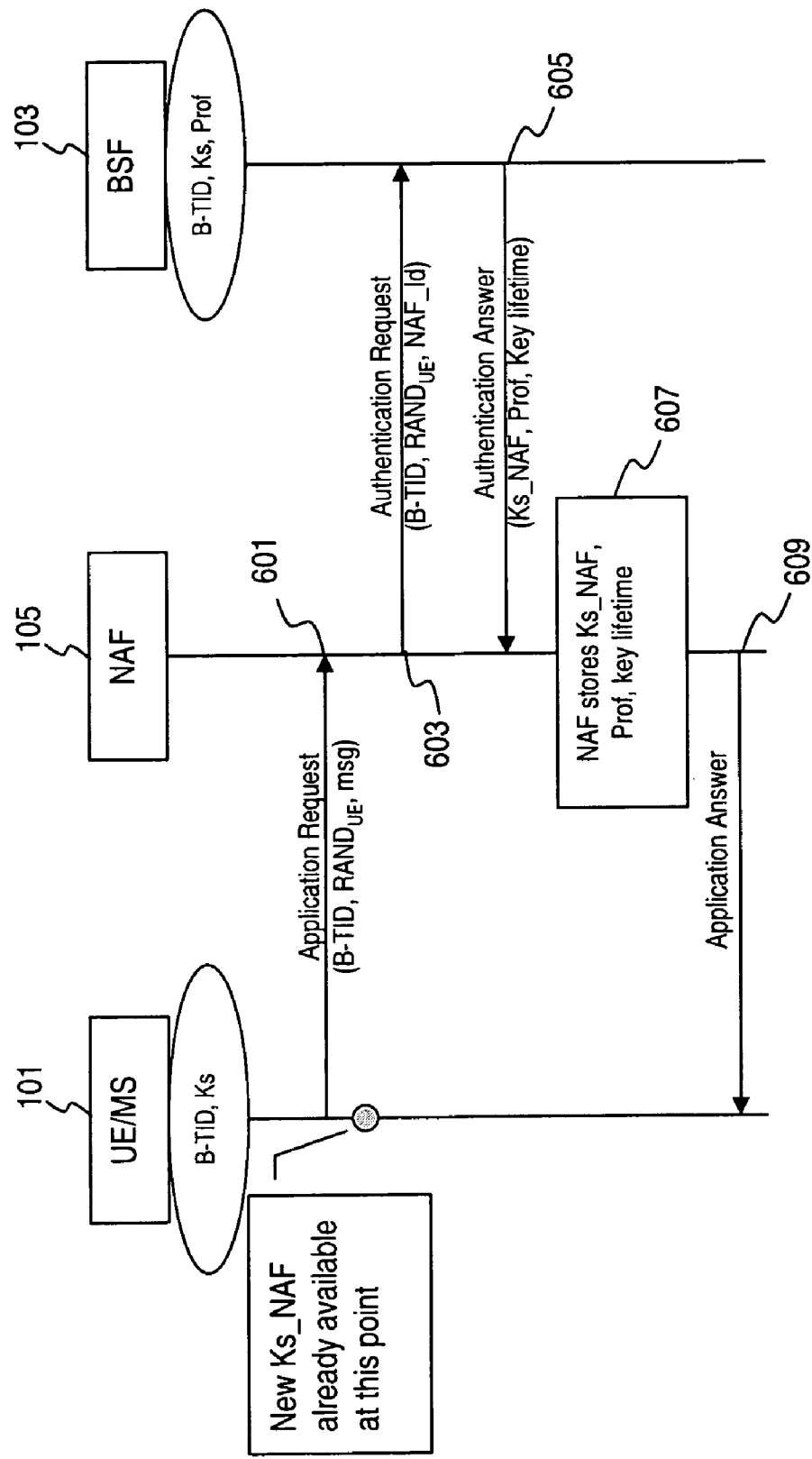
FIG. 6 is a diagram of a procedure for refreshing a session key by utilizing a random number of a user equipment, according to an embodiment of the invention.

FIG. 6 is a diagram of a procedure for refreshing a session key by utilizing a random number (e.g., $RAND_{UE}$) of a user equipment, according to an embodiment of the invention. This case may apply when the UE 101 has knowledge that Ks_NAF needs to be refreshed when contacting the NAF 105. In step 601, the LIE 101 sends an application request, with B-TID, $RAND_{UE}$, and the application protocol message. In essence, the UE 101 wants to refresh the Ks_NAF key at the very start. Consequently, the LIE 101 already has the refreshed Ks_NAF available, and therefore may include a credential based on the refreshed Ks_NAF (not shown).

In step 603, the NAF 105 sends an authentication request to the BSF 103. The request comprises the B-TID, $RAND_{UE}$, and NAF_Id. The BSF 103 retrieves the Ks based on the B-TID received, and then derives a new Ks_NAF from Ks, $RAND_{UE}$, NAF_Id, and possibly other information. The BSF 103 transmits the Ks_NAF, together with its lifetime, and the user profile in an authentication answer message (step 605) to the NAF 105.

In step 607, the NAF 105 stores the Ks_NAF, the associated lifetime, and user profile. The NAF 105 can verify the credential sent by the UE 101 in step 601 using the Ks_NAF. If successful, the UE 101 is authenticated and an application answer is sent back to the UI 101, per step 609.

It is noted that for a given Ks and NAF 105, the same $RAND_{UE}$ will result in the same Ks_NAF. Therefore, it may be desirable that the UE 101 not use the same $RAND_{UE}$ more than once over the lifetime of a particular Ks. In one embodiment, the NAF 105 can maintain a list of $RAND_{UE}$ previously used by a UE 101 for a particular B-TID to monitor usage to avoid duplicate use.

Figure 7:
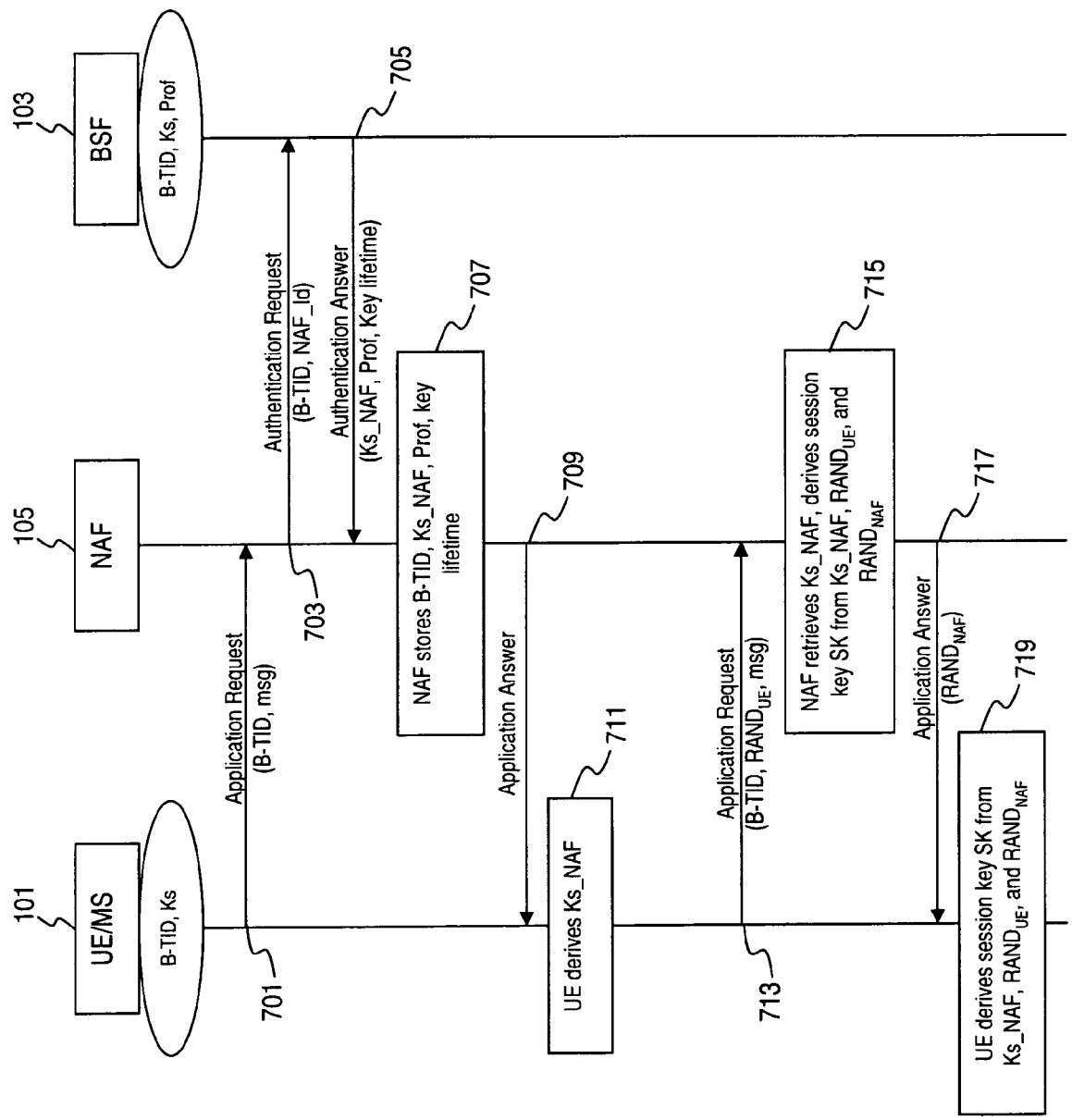
FIG. 7 is a diagram of a procedure for refreshing a session key without involving a Bootstrapping Server Function (BSF), according to an embodiment of the invention.

FIG. 7 is a diagram of a procedure for refreshing a session key without involving a Bootstrapping Server Function (BSF), according to an embodiment of the invention. As shown in FIG. 7, the application key can be refreshed without even involving the BSF. This is achieved by introducing an extra level of key derivation, such that the initial Ks_NAF is used as a seed to derive session keys, SK, which are the keys actually used by the application. This process is explained below.

Steps 701-709 are similar to steps 301-309 of FIG. 3; namely, these steps 701-709 capture the basic bootstrapping usage procedure without key refreshing as currently specified in the 3GPP/3GPP2 GBA specifications. At the end of step 407, both UE 101 and NAF 105 possess the same Ks_NAF. Namely, the UE 101 can derive the Ks_NAF, as in step 711. Under the approach of FIG. 7, this Ks_NAF is used as a seed to derive further session keys to be used between the UE 101 and the NAF 105.

When an application session is to be set up, the UE 101 sends an application request to the NAF 105 (step 713), which can comprise the B-TID, the protocol message, a MAC, and $RAND_{UE}$. Upon receiving the application request, the NAF 105 determines that the Ks_NAF exists. The NAF 105 selects a $RAND_{NAF}$, and derives a fresh session key SK based on Ks_NAF, $RAND_{UE}$, $RAND_{NAF}$, and possibly other information (step 715). The NAF 105 forwards the $RAND_{NAF}$ in an application answer to the UE 101 (step 717).

At this stage, the UE 101 can also derive, as in step 719, the session key SK in a manner similar to that of the NAF 105. From this point on, the SK can be used to establish secure session between the UE 101 and the NAF 105. It is noted that the BSF 103 is not involved in this session key generation process. This approach has the added advantage of reducing the workload of the BSF 103.

For each new session, a new SK may be generated by repeating steps 713 and 717. It is noted that although both $RAND_{UE}$ and $RAND_{NAF}$ are used in the above description, a single nonce can also be used (as described previously).

It is recognized that by leveraging the authentication infrastructure of 3GPP and 3GPP2 networks, the Generic Bootstrapping Architecture (GBA) allows bootstrapping of shared secrets between a UE 101 and the home network (BSF 103), which can then be used to derive further shared secrets to be used between the UE 101 and the NAF 105.

One of ordinary skill in the art would recognize that the processes for refreshing keys may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 8.

Figure 8:
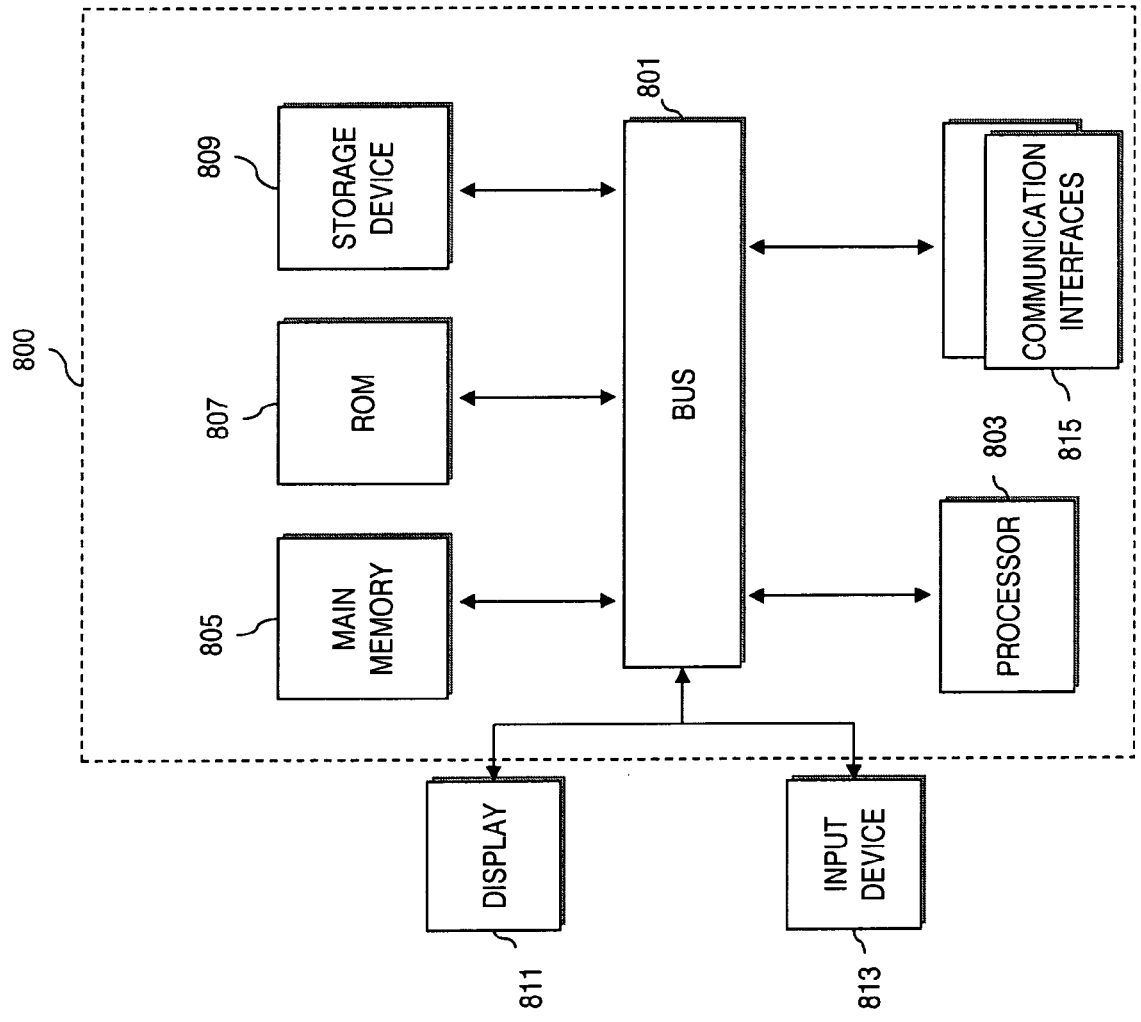
FIG. 8 is a diagram of hardware that can be used to implement various embodiments of the invention.

FIG. 8 illustrates exemplary hardware upon which various embodiments of the invention can be implemented. A computing system 800 includes a bus 801 or other communication mechanism for communicating information and a processor 803 coupled to the bus 801 for processing information. The computing system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computing system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computing system 800 may be coupled via the bus 801 to a display 811, such as a liquid crystal display, or active matrix display, for displaying information to a user. An input device 813, such as a keyboard including alphanumeric and other keys, may be coupled to the bus 801 for communicating information and command selections to the processor 803. The input device 813 can include a cursor control, such as a mouse, a trackball, or cursor direction keys, for communicating direction information and command selections to the processor 803 and for controlling cursor movement on the display 811.

According to various embodiments of the invention, the processes described herein can be provided by the computing system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 800 also includes at least one communication interface 815 coupled to bus 801. The communication interface 815 provides a two-way data communication coupling to a network link (not shown). The communication interface 815 sends and receives electrical, electromagnetic, or optical signals that carry digital data streams representing various types of information. Further, the communication interface 815 can include peripheral interface devices, such as a Universal Serial Bus (USB) interface, a PCMCIA (Personal Computer Memory Card International Association) interface, etc.

The processor 803 may execute the transmitted code while being received and/or store the code in the storage device 809, or other non-volatile storage for later execution. In this manner, the computing system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9A:
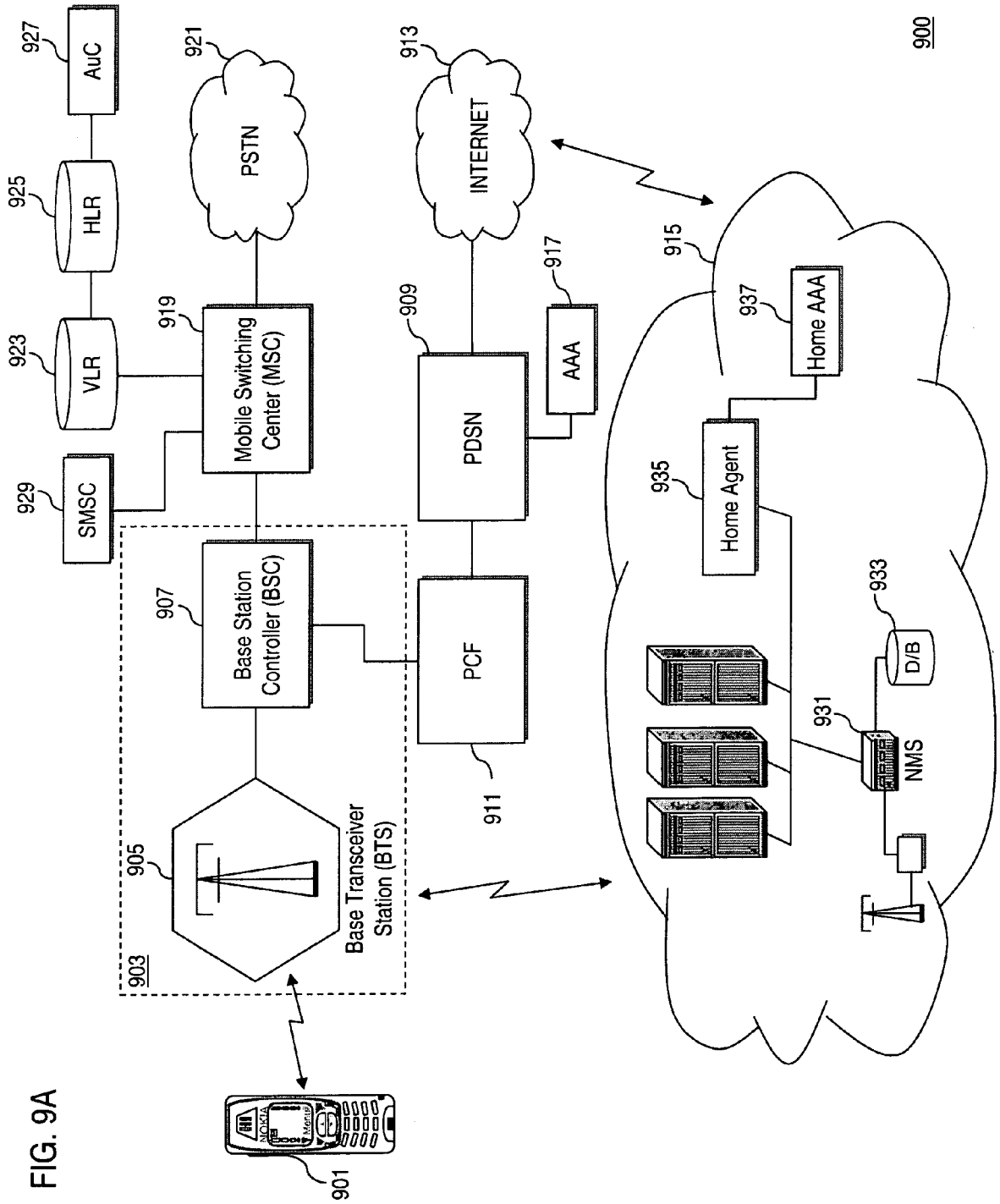
FIGS. 9A and 9B are diagrams of different cellular mobile phone systems capable of supporting various embodiments of the invention.
Figure 9B:
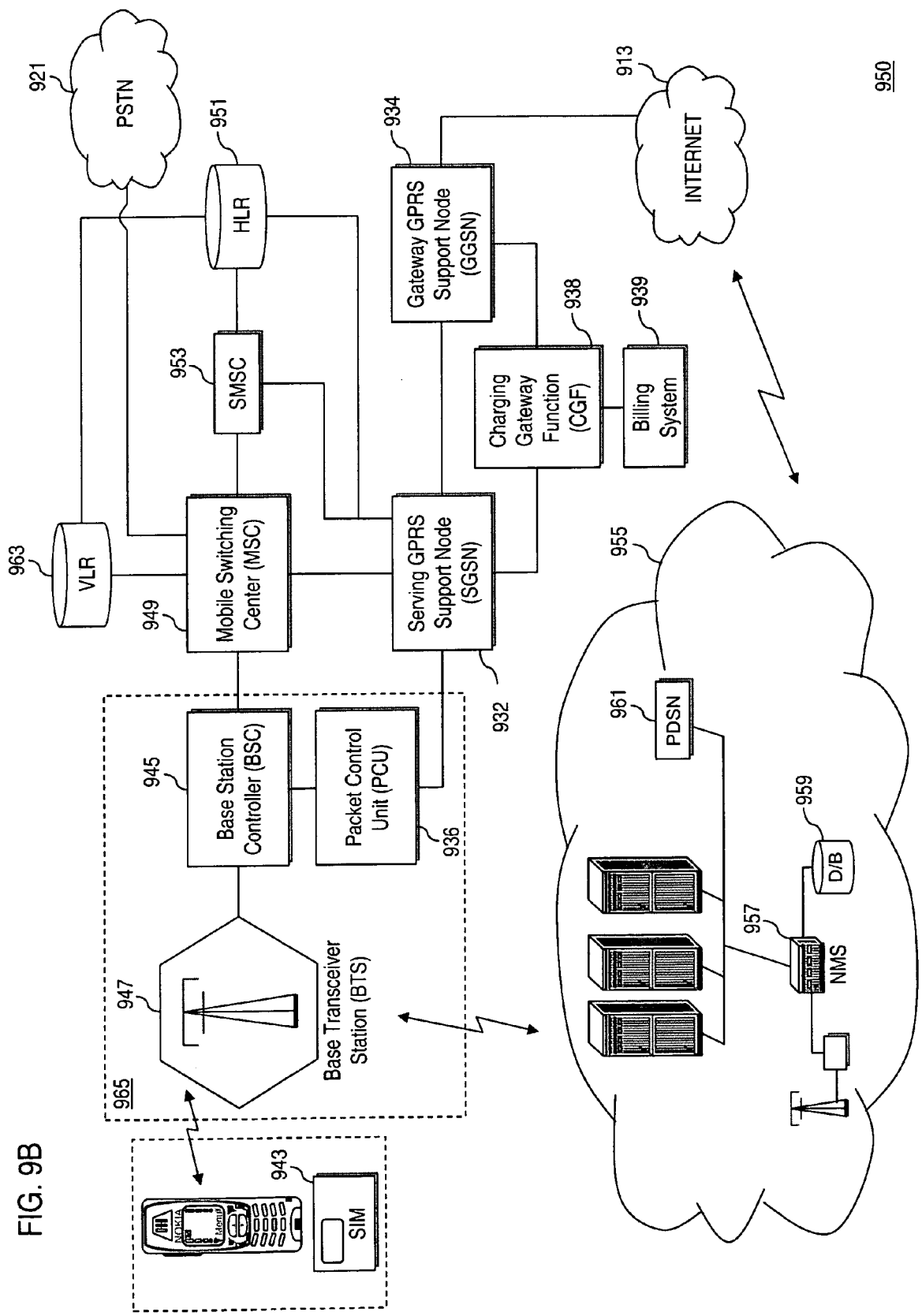

FIGS. 9A and 9B are diagrams of different cellular mobile phone systems capable of supporting various embodiments of the invention. FIGS. 9A and 9B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 900 includes mobile stations 901 (e.g., handsets, terminals, stations, units, devices, or any type of interface to the user (such as "wearable" circuitry, etc.)) in communication with a Base Station Subsystem (BSS) 903. According to one embodiment of the invention, the radio network supports Third Generation (3G) services as defined by the International Telecommunications Union (ITU) for International Mobile Telecommunications 2000 (IMT-2000).

In this example, the BSS 903 includes a Base Transceiver Station (BTS) 905 and Base Station Controller (BSC) 907. Although a single BTS is shown, it is recognized that multiple BTSs are typically connected to the BSC through, for example, point-to-point links. Each BSS 903 is linked to a Packet Data Serving Node (PDSN) 909 through a transmission control entity, or a Packet Control Function (PCF) 911. Since the PDSN 909 serves as a gateway to external networks, e.g., the Internet 913 or other private consumer networks 915, the PDSN 909 can include an Access, Authorization and Accounting system (AAA) 917 to securely determine the identity and privileges of a user and to track each user's activities. The network 915 comprises a Network Management System (NMS) 931 linked to one or more databases 933 that are accessed through a Home Agent (HA) 935 secured by a Home AAA 937.

Although a single BSS 903 is shown, it is recognized that multiple BSSs 903 are typically connected to a Mobile Switching Center (MSC) 919. The MSC 919 provides connectivity to a circuit-switched telephone network, such as the Public Switched Telephone Network (PSTN) 921. Similarly, it is also recognized that the MSC 919 may be connected to other MSCs 919 on the same network 900 and/or to other radio networks. The MSC 919 is generally collocated with a Visitor Location Register (VLR) 923 database that holds temporary information about active subscribers to that MSC 919. The data within the VLR 923 database is to a large extent a copy of the Home Location Register (HLR) 925 database, which stores detailed subscriber service subscription information. In some implementations, the HLR 925 and VLR 923 are the same physical database; however, the HLR 925 can be located at a remote location accessed through, for example, a Signaling System Number 7 (SS7) network. An Authentication Center (AuC) 927 containing subscriber-specific authentication data, such as a secret authentication key, is associated with the HLR 925 for authenticating users. Furthermore, the MSC 919 is connected to a Short Message Service Center (SMSC) 929 that stores and forwards short messages to and from the radio network 900.

During typical operation of the cellular telephone system, BTSs 905 receive and demodulate sets of reverse-link signals from sets of mobile units 901 conducting telephone calls or other communications. Each reverse-link signal received by a given BTS 905 is processed within that station. The resulting data is forwarded to the BSC 907. The BSC 907 provides call resource allocation and mobility management functionality including the orchestration of soft handoffs between BTSs 905. The BSC 907 also routes the received data to the MSC 919, which in turn provides additional routing and/or switching for interface with the PSTN 921. The MSC 919 is also responsible for call setup, call termination, management of inter-MSC handover and supplementary services, and collecting, charging and accounting information. Similarly, the radio network 900 sends forward-link messages. The PSTN 921 interfaces with the MSC 919. The MSC 919 additionally interfaces with the BSC 907, which in turn communicates with the BTSs 905, which modulate and transmit sets of forward-link signals to the sets of mobile units 901.

As shown in FIG. 9B, the two key elements of the General Packet Radio Service (GPRS) infrastructure 950 are the Serving GPRS Supporting Node (SGSN) 932 and the Gateway GPRS Support Node (GGSN) 934. In addition, the GPRS infrastructure includes a Packet Control Unit PCU (1336) and a Charging Gateway Function (CGF) 938 linked to a Billing System 939. A GPRS the Mobile Station (MS) 941 employs a Subscriber Identity Module (SIM) 943.

The PCU 936 is a logical network element responsible for GPRS-related functions such as air interface access control, packet scheduling on the air interface, and packet assembly and re-assembly. Generally the PCU 936 is physically integrated with the BSC 945; however, it can be collocated with a BTS 947 or a SGSN 932. The SGSN 932 provides equivalent functions as the MSC 949 including mobility management, security, and access control functions but in the packet-switched domain. Furthermore, the SGSN 932 has connectivity with the PCU 936 through, for example, a Fame Relay-based interface using the BSS GPRS protocol (BSSGP). Although only one SGSN is shown, it is recognized that that multiple SGSNs 931 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 945, any given BSC 945 generally interfaces with one SGSN 932. Also, the SGSN 932 is optionally connected with the HLR 951 through an SS7-based interface using GPRS enhanced Mobile Application Part (MAP) or with the MSC 949 through an SS7-based interface using Signaling Connection Control Part (SCCP). The SGSN/HLR interface allows the SGSN 932 to provide location updates to the HLR 951 and to retrieve GPRS-related subscription information within the SGSN service area. The SGSN/MSC interface enables coordination between circuit-switched services and packet data services such as paging a subscriber for a voice call. Finally, the SGSN 932 interfaces with a SMSC 953 to enable short messaging functionality over the network 950.

The GGSN 934 is the gateway to external packet data networks, such as the Internet 913 or other private customer networks 955. The network 955 comprises a Network Management System (NMS) 957 linked to one or more databases 959 accessed through a PDSN 961. The GGSN 934 assigns Internet Protocol (IP) addresses and can also authenticate users acting as a Remote Authentication Dial-In User Service host. Firewalls located at the GGSN 934 also perform a firewall function to restrict unauthorized traffic. Although only one GGSN 934 is shown, it is recognized that a given SGSN 932 may interface with one or more GGSNs 933 to allow user data to be tunneled between the two entities as well as to and from the network 950. When external data networks initialize sessions over the GPRS network 950, the GGSN 934 queries the OLR 951 for the SGSN 932 currently serving a MS 941.

The BTS 947 and BSC 945 manage the radio interface, including controlling which Mobile Station (MS) 941 has access to the radio channel at what time. These elements essentially relay messages between the MS 941 and SGSN 932. The SGSN 932 manages communications with an MS 941, sending and receiving data and keeping track of its location. The SGSN 932 also registers the MS 941, authenticates the MS 941, and encrypts data sent to the MS 941.

Figure 10:
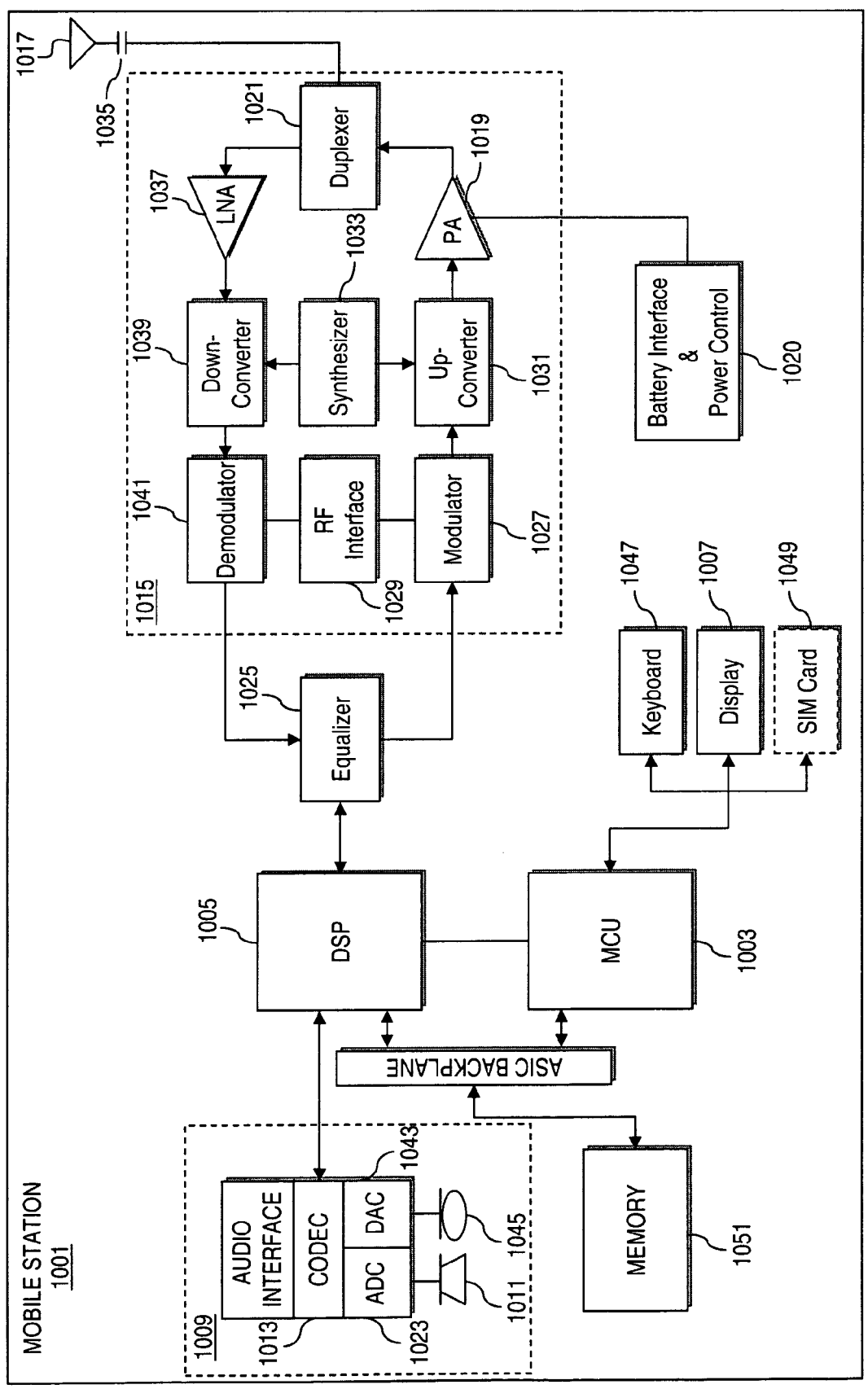
FIG. 10 is a diagram of exemplary components of a mobile station capable of operating in the systems of FIGS. 9A and 9B, according to an embodiment of the invention.

FIG. 10 is a diagram of exemplary components of a mobile station (e.g., handset) capable of operating in the systems of FIGS. 9A and 9B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system (e.g., systems of FIG. 14A or 14B), via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

Figure 11:
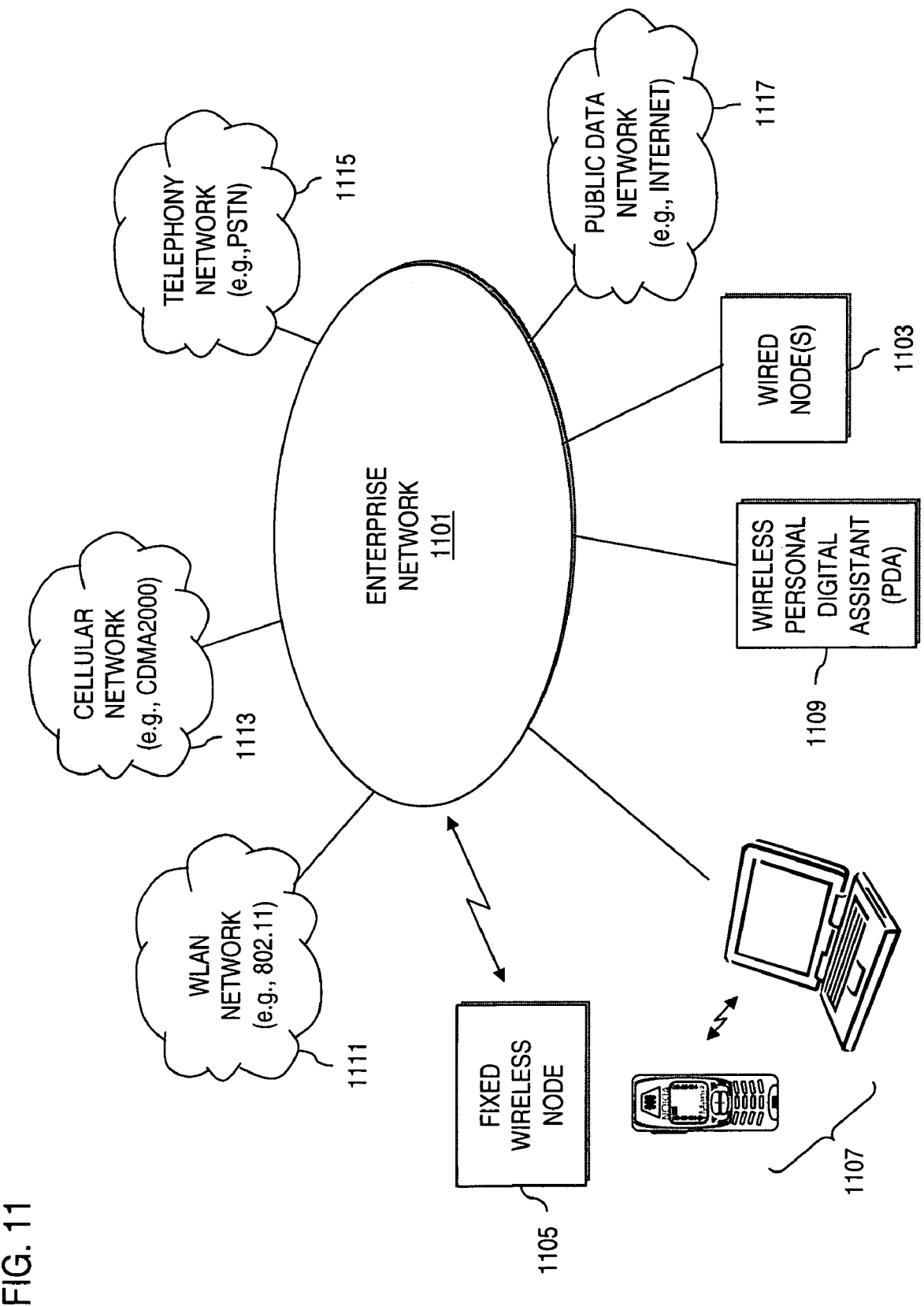
FIG. 11 is a diagram of an enterprise network capable of supporting the processes described herein, according to an embodiment of the invention.

FIG. 11 shows an exemplary enterprise network, which can be any type of data communication network utilizing packet-based and/or cell-based technologies (e.g., Asynchronous Transfer Mode (ATM), Ethernet, IP-based, etc.). The enterprise network 1101 provides connectivity for wired nodes 1103 as well as wireless nodes 1105-1109 (fixed or mobile), which are each configured to perform the processes described above. The enterprise network 1101 can communicate with a variety of other networks, such as a WLAN network 1111 (e.g., IEEE 802.11), a cdma2000 cellular network 1113, a telephony network 1115 (e.g., PSTN), or a public data network 1117 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method performed by a processor comprising:
generating, by the processor, an application request for transmission to a network element configured to provide authentication and secure services;
receiving, by the processor, a message, in response to the application request, indicating refreshment of a key that is used to provide secure communications with the network element; and
deriving, by the processor, a refreshed key based on the received message,
wherein the refreshed key is derived, from one or more parameters of a previous bootstrapping procedure, before the network element transmits an authentication request to a bootstrapping network element configured to provide bootstrapping functions.

2. A method according to claim 1, wherein the message in the receiving step includes a random number selected by the network element.

3. A method according to claim 2, further comprising:
generating another random number; and
transmitting another application request to the network element, the other application request specifying credentials that include the other random number, wherein the random numbers are forwarded to the bootstrapping network element configured to provide the bootstrapping functions.

4. A method according to claim 3, wherein the bootstrapping network element is further configured to generate an authentication answer including the refresh key and an application specific portion of a user profile.

5. A method according to claim 3, further comprising:
verifying the credentials specified in the second application request.

6. A method according to claim 2, further comprising:
transmitting another application request to the network element, the other application request specifying credentials that include a transaction identifier and an application protocol message, wherein the network element generates the authentication request for transmission to the bootstrapping network element configured to provide the bootstrapping functions, wherein the authentication request specifies the transaction identifier, the random number and a domain name of the network element.

7. A method according to claim 6, wherein the bootstrapping network element is further configured to retrieve a bootstrapping key based on the transaction identifier, to generate a fresh session key based on the bootstrapping key and the random number, and to generate an authentication answer that includes the generated fresh session key, a lifetime parameter associated with the retrieved refreshed key, and a user profile, the method further comprising:
  receiving an application answer from the network element indicating successful authentication.

8. A method according to claim 1, wherein the network element is configured to communicate using spread spectrum and to operate according to a generic authentication architecture.

9. A method performed by a processor comprising:
  generating, by the processor, a random number corresponding to a refreshed key;
  transmitting, by the processor, an application request to a network element configured to provide authentication and secure services, wherein the application request specifies a transaction identifier, the random number, and an application protocol message, the network element being further configured to forward an authentication request to a bootstrapping network element configured to provide bootstrapping functions after the application request is transmitted, the authentication request specifying the transaction identifier, the random number and a domain name associated with the network element, wherein the bootstrapping network element is further configured to retrieve the bootstrapping key based on the transaction identifier, generate a fresh session key based on the bootstrapping key and the random number, and to generate an authentication answer that includes the generated fresh session key, a lifetime parameter associated with the retrieved refreshed key, and a user profile; and
  receiving, by the processor, an application answer from the network element indicating successful authentication, wherein the refreshed key is available before the application request is transmitted to the network element.

10. A method according to claim 9, wherein the network element and the bootstrapping network element are configured to communicate using spread spectrum and to operate according to a generic authentication architecture.

11. A method performed by a processor comprising:
  generating, by the processor, a first random number;
  transmitting, by the processor, an application request to a network element configured to provide secure services, wherein the application request specifies a transaction identifier, the first random number, and an application protocol message, the network element being further configured to select a second random number;
  receiving, by the processor, an application answer specifying the second random number from the network element; and
  deriving, by the processor, in response to the application request, a fresh session key based on a bootstrapping key, the first random number, and a second random number, wherein the fresh session key is used to provide secure communication with the network element,
  wherein the fresh session key is derived, from one or more parameters of a previous bootstrapping procedure, before the network element transmits an authentication request to a bootstrapping network element configured to provide bootstrapping functions.

12. A method according to claim 11, wherein the network element is configured to communicate using spread spectrum and to operate according to a generic authentication architecture.

13. A method according to claim 11, wherein the bootstrapping network element is further configured to retrieve a bootstrapping key based on the transaction identifier, to generate a fresh session key based on the bootstrapping key and the second random number, and to generate an authentication answer that includes the generated fresh session key, a lifetime parameter associated with the retrieved refreshed key, and a user profile, the method further comprising:
  receiving another application answer from the network element indicating successful authentication.

14. An apparatus comprising:
  a processor configured to generate an application request for transmission to a network element configured to provide secure services, wherein the processor is further configured to receive a message, in response to the application request, indicating refreshment of a key that is used to provide secure communications with the network element, the processor being further configured to derive a refreshed key based on the received message, and wherein the refreshed key is derived, from one or more parameters of a previous bootstrapping procedure, before the network element transmits an authentication request to a bootstrapping network element configured to provide bootstrapping functions.

15. An apparatus according to claim 14, wherein the message includes a random number selected by the network element.

16. A system comprising the apparatus and the network element of claim 14.

17. An apparatus according to claim 15, wherein the processor is further configured to generate another random number, and to generate another application request for transmission to the network element, the other application request specifying credentials that include the other random number, wherein the random numbers are forwarded to the bootstrapping network element configured to provide the bootstrapping functions.

18. An apparatus according to claim 17, wherein the bootstrapping network element is further configured to generate an authentication answer including the refresh key and an application specific portion of a user profile.

19. An apparatus according to claim 17, wherein the processor is further configured to verify the credentials specified in the second application request.

20. An apparatus according to claim 15, wherein the processor is further configured to generate another application request for transmission to the network element, the other application request specifying credentials that include a transaction identifier and an application protocol message, wherein the network element generates the authentication request for transmission to the bootstrapping network element configured to provide the bootstrapping functions, wherein the authentication request specifies the transaction identifier, the random number and a domain name of the network element.

21. An apparatus according to claim 20, wherein the bootstrapping network element is further configured to retrieve the bootstrapping key based on the transaction identifier, generate a fresh session key based on the bootstrapping key and the random number, and to generate an authentication answer that includes the retrieved refreshed key, a lifetime parameter associated with the generated fresh session key, and a user profile, the apparatus further comprising:
  a transceiver coupled to the processor and configured to receive an application answer from the network element indicating successful authentication.

22. An apparatus according to claim 14, wherein the network element is configured to communicate using spread spectrum and to operate according to a generic authentication architecture.

23. A system comprising the apparatus and the network element of claim 14.

24. An apparatus comprising:
   a processor configured to generate a random number corresponding to a refreshed key; and
   a transceiver configured to transmit an application request to a network element configured to provide secure services,
   wherein the application request specifies a transaction identifier, the random number, and an application protocol message, the network element being further configured to forward an authentication request to a bootstrapping network element configured to provide bootstrapping functions after the application request is transmitted, the authentication request specifying the transaction identifier, the random number and a domain name associated with the network element,
   wherein the bootstrapping network element is further configured to retrieve the bootstrapping key based on the transaction identifier, generate a fresh session key based on the bootstrapping key and the random number, and to generate an authentication answer that includes the generated fresh session key, a lifetime parameter associated with the retrieved refreshed key, and a user profile,
   wherein the transceiver is further configured to receive an application answer from the network element indicating successful authentication, and
   wherein the refreshed key is available before the application request is transmitted to the network element.

25. An apparatus according to claim 24, wherein the network element and the bootstrapping network element are configured to communicate using spread spectrum and to operate according to a generic authentication architecture.

26. A system comprising the apparatus and the network element of claim 24.

27. An apparatus comprising:
   a processor configured to generate a first random number; and
   a transceiver coupled to the processor and configured to transmit an application request to the network element, wherein the application request specifies a transaction identifier, the random number, and an application protocol message, the network element being further configured to select a second random number,
   wherein the transceiver is further configured to receive an application answer specifying the second random number from the network element,
   wherein the processor is further configured to derive, in response to the application request, a fresh session key based on a bootstrapping key, the first random number, and a second random number, wherein the fresh session key is used to provide secure communication with the network element, and
   wherein the fresh session key is derived, from one or more parameters of a previous bootstrapping procedure, before the network element transmits an authentication request to a bootstrapping network element configured to provide bootstrapping functions.

28. An apparatus according to claim 27, wherein the network element and the bootstrapping network element are configured to communicate using spread spectrum and to operate according to a generic authentication architecture.

29. A method performed by a processor comprising:
   receiving, by the processor, an application request from a user equipment, the request specifying a transaction identifier;
   determining, by the processor, in response to the application request, whether the user equipment is indicating that a new bootstrapping has been performed or is seeking to refresh a session key based on the received transaction identifier without performing the new bootstrapping; and
   refreshing, by the processor, the session key without performing the new bootstrapping or using a new bootstrapping key material associated with the new bootstrapping based on the determination.

30. A method according to claim 29, wherein the user equipment is configured to communicate using spread spectrum and to operate according to a generic authentication architecture.

31. A system comprising:
   means for receiving an application request from a user equipment, the request specifying a transaction identifier;
   means for determining, in response to the application request, whether the user equipment is indicating that a new bootstrapping has been performed or is seeking to refresh a session key based on the received transaction identifier without performing the new bootstrapping; and
   means for refreshing the session key without performing the new bootstrapping or using the new bootstrapping key material based on the determination.

32. A system according to claim 31, wherein the user equipment is configured to communicate using spread spectrum and to operate according to a generic authentication architecture.

* * * * *